United States Patent [19]
Manning et al.

[11] Patent Number: 5,781,504
[45] Date of Patent: Jul. 14, 1998

[54] SHALLOW WATER BEAMFORMING METHODOLOGY FOR TOROIDAL VOLUME SEARCH SONAR

[75] Inventors: Robert C. Manning; Robert J. McDonald; Jo Ellen Wilbur, all of Panama City Beach, Fla.

[73] Assignee: The United States of America as represented by the Secretary of the Navy, Washington, D.C.

[21] Appl. No.: 869,722

[22] Filed: Jun. 5, 1997

[51] Int. Cl.$^6$ .................................................. G01S 15/89
[52] U.S. Cl. ............................. 367/88; 367/103; 367/12
[58] Field of Search ............................. 367/103, 88, 105, 367/12

[56] References Cited

U.S. PATENT DOCUMENTS 5,506,812  4/1996  Zehner ........................................ 367/88

Primary Examiner—Daniel T. Pihulic
Attorney, Agent, or Firm—Harvey A. Gilbert

[57] ABSTRACT

An apparatus and method for beamforming for a toroidal volume search sonar. Sonar array vehicle motion is used to reduce reverberation by fixing beams geometrically in space to prevent beam contact, prior to a specified range, with the sea surface or sea bottom interfaces. Reverberation is further reduced by creating a composite beam from one scanned beam containing the target dominated by surface reverberation and another dominated by bottom reverberation. A correlation and averaging procedure is applied to the two scanned beams to further reduce the reverberation in the composite beam. To further reduce reverberation, the two beams selected for correlation and averaging processing are chosen such that the number of common elements associated with the two beams is a minimum within a given angular separation.

18 Claims, 6 Drawing Sheets

SHALLOW WATER BEAMFORMING METHODOLOGY FOR TOROIDAL VOLUME SEARCH SONAR

BACKGROUND OF THE INVENTION

The invention relates to sonar beamforming methodology and apparatus. In particular, the present invention is a beamforming methodology and apparatus for improving the long range, shallow water, detection capability of a toroidal volume search sonar (TVSS).

A toroidal volume search sonar (TVSS) has successfully been used in detecting mine-like objects in shallow water. The toroidal shaped array configuration used in the TVSS has advantages over a standard linear shaped array for mine detection in shallow water because the TVSS configuration allows the construction of very narrow (vertical width) beams, which can penetrate deeply into a shallow water column before contacting the interfaces and becoming corrupted by reverberation. Vehicle motion (primarily roll) causes the narrow beams to contact the interfaces, thus limiting the useful long range detection capability of a TVSS. Targets located at long ranges near the interfaces are particularly hard to detect because surface and/or bottom reverberation will reduce the signal to noise ratio (SNR).

Exemplary of the prior art toroidal volume search sonar is the description in the U.S. Pat. No. 5,506,812 to W. J. Zehner.

FIG. 1 is a functional block diagram of a conventional phase shift beam-former applied to a TVSS array in accordance with the prior art. In this prior art system, the circular transducer array geometry permits one to form 180 two degree beams from the 120 transducer elements. Of the 60 elements that comprise half the array, only 42 are used in the creation of a single beam. The element pattern is chosen such that when projected to a straight line perpendicular to the beam trajectory, as illustrated in FIG. 2, the relative spacing between the elements is approximately uniform. In this prior art system, no attempt is made to prevent the beams from contacting the interfaces. If the sonar platform rotates, then the beams rotate with the platform. There is no correction angle for vehicle roll, and hence the direction in which a particular beam looks is constantly changing with the vehicle roll angle.

SUMMARY OF THE INVENTION

It is, therefore, an object of the present invention to use vehicle motion data to stabilize (geometrically fix in space) the TVSS beams so as to prevent one or more beams from contacting, prior to a prespecified range, the sea surface or sea bottom interfaces, thus extending the detection range capability of the sonar.

It is still another object of the present invention to point selected stabilized beams along trajectories (i.e. scan) near the interfaces in order to reduce the reverberation entering those beams so as to increase the probability of detecting mines located near those interfaces.

It is still another object of the present invention to create a composite beam from two scanned beams, one containing the target and dominated by bottom reverberation and one containing the target and dominated by surface reverberation, said composite beam created by a correlation and averaging procedure using the two scanned beams such that it has reduced reverberation level, so as to increase the probability of detecting a mine near an interface.

It is still another object of the present invention to create the aforementioned composite beam such that the number of common elements associated with the two beams to be correlated and averaged is a minimum within a given angular separation between the beams, thus reducing the system noise in the composite beam so as to further increase the probability of detecting a mine near an interface.

Improving the long range detection capability of a TVSS requires changes to the beamforming process in order to limit the surface and bottom reverberation entering the beams. The present invention accomplishes this through two means: one, by preventing a beam from contacting an interface such as the surface and the bottom, and two, by forming, from two beams, a composite beam where the reverberation has been partially and measurably canceled out.

The present invention uses a vehicle motion sensor to obtain continuous vehicle roll angle information during a ping cycle. The roll angle information is used to calculate a shift index to minimize beam steering and to calculate the necessary roll correction angle to keep the beams geometrically fixed in space. The circular symmetry of the transducer element pattern allows the same roll correction angle to be applied to all beams formed to keep them geometrically fixed in space. The depth and height of the sonar platform are used to calculate a scanning update angle, an additional steering angle which tracks selected beams along predetermined paths called scanning trajectories. The stabilized (geometrically fixed in space) beam points radially along a straight-line path from the array until the upper 3 dB point of the beam contacts the predetermined scanning trajectory. See FIG. 3. The scanning trajectory is located arbitrarily usually as a function of sea state and accuracy of vehicle motion measurement package. At that time, scanning is initiated by the steering beam for a fixed distance before it is steered again. Both an upper trajectory for sea surface and a lower trajectory for sea bottom are defined. The 3 dB point of the scanned beam is never allowed to penetrate beyond the scanning trajectory. Finally, the invention creates a composite beam by averaging the intensity of two scanned beams. The reverberation noise in the composite beam is minimized by a judicious choice of beam numbers and scanning trajectories. The reduction of system noise is minimized by creating the two scanned beams from a maximum number of uncommon elements within a given angular beam separation.

BRIEF DESCRIPTION OF THE DRAWINGS

Other objects, advantages, and features of the present invention will be apparent from the following detailed description when considered in conjunction with the accompanying drawings in which.

DETAILED DESCRIPTION

Figure 1:
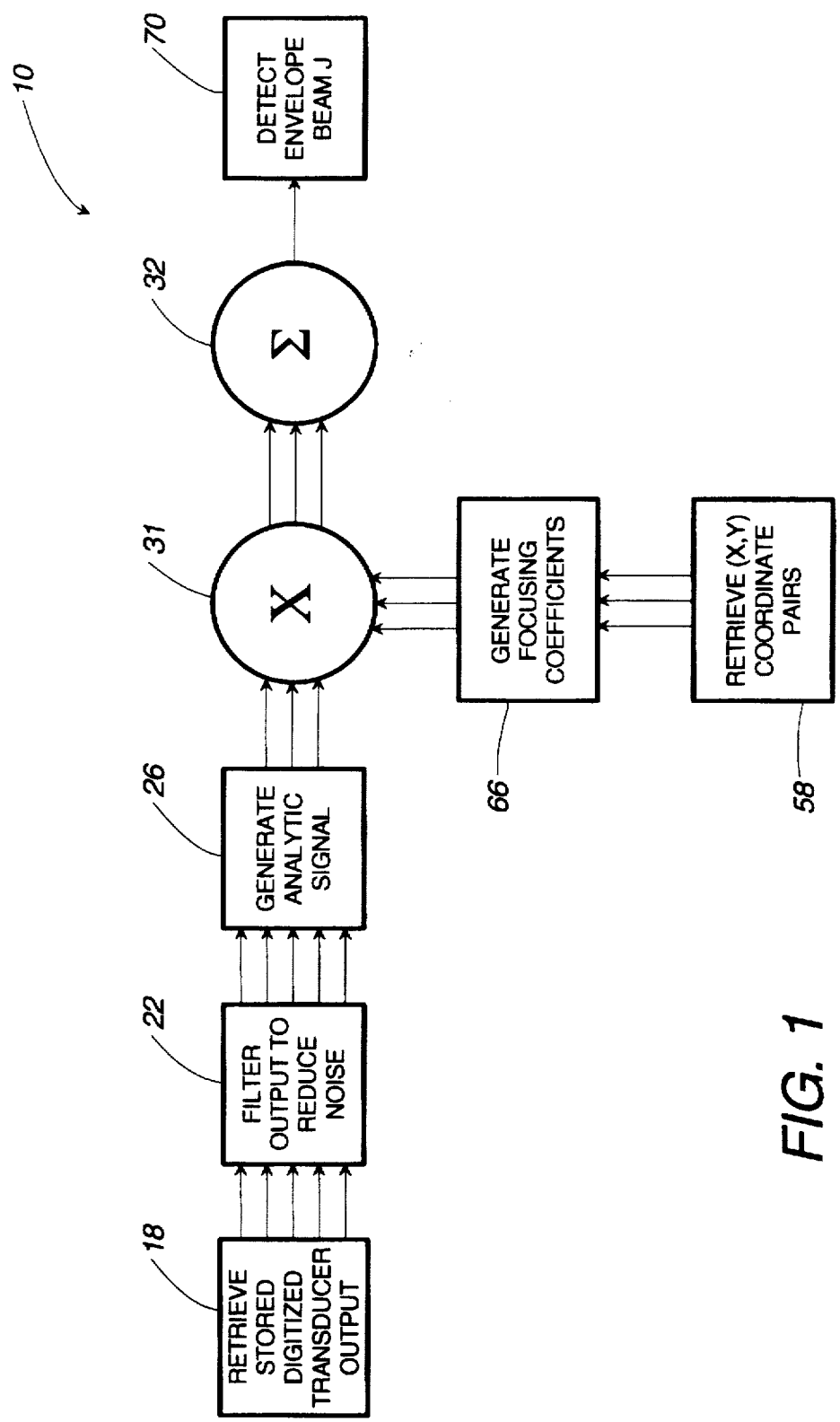
FIG. 1 is a block diagram of a conventional TVSS phase shift beam-former in accordance with the prior art.
Figure 4:
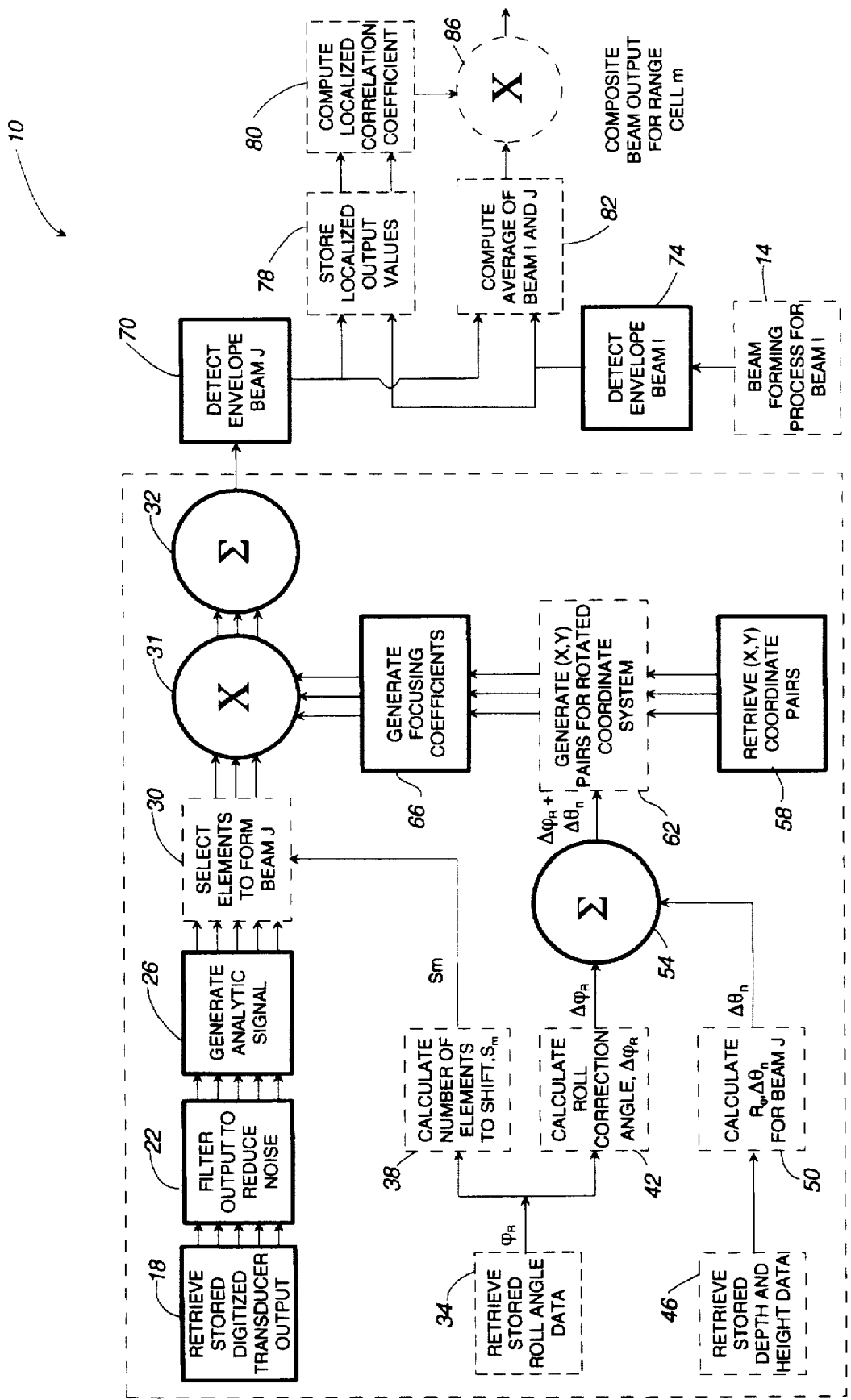
FIG. 4 is a block diagram of the proposed invention.

With reference to FIG. 4, the process 10 of the present invention is comprised of two beamforming processes; the process 12 for beam J and the process 14 for beam I. The two processes may be executed in various ways and by various means. It should be noted, however, that the process of the prior art shown in FIG. 1 is depicted in solid boxes as a part of the present invention in FIG. 4.

Figure 5:
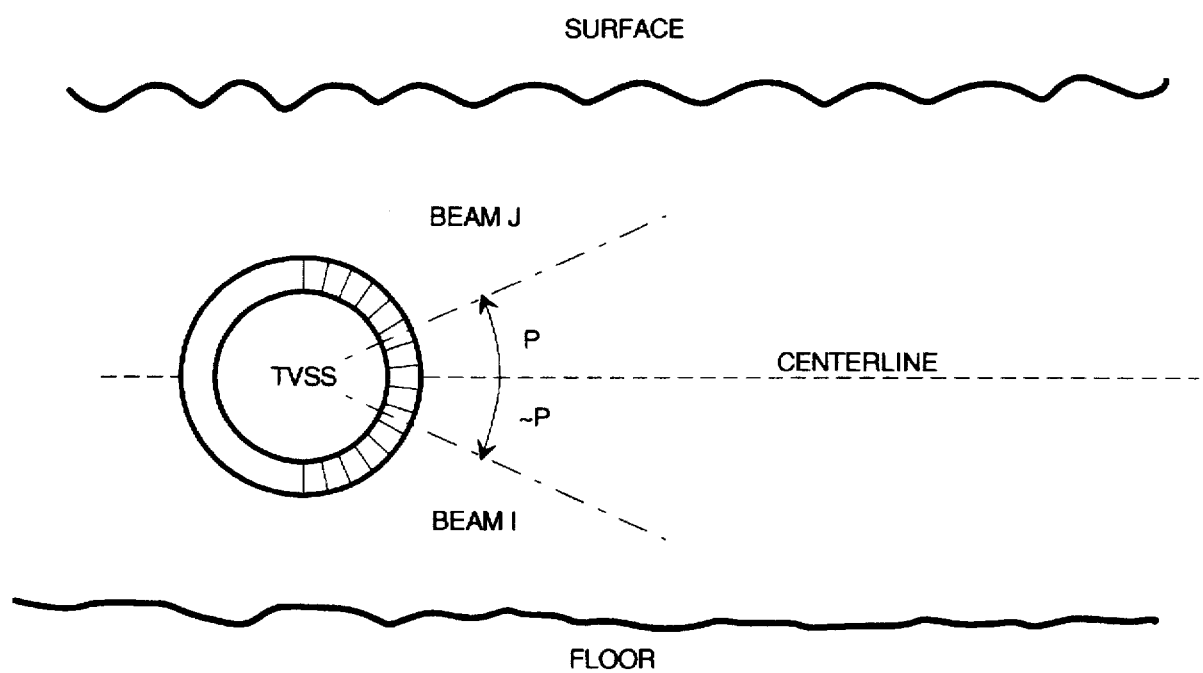
FIG. 5 is representation of beam I and beam J spatial separation.

With reference to FIG. 5, the process for selecting beams J and I is as follows: The choice of J is somewhat arbitrary. If beam J is chosen to be the beam which is p degrees off the center line, then beam I can be selected to yield a minimum of common elements between beams which are separated by approximately 2 times p.

Step 1: choosing beam J to be that beam which is at an angular offset of p degrees from the beam which goes down the center of the water column. The offset p should be on the order of 10 degrees or less.

Step 2: checking the number (even or odd) of the transducer element (1 through 120) whose output data is loaded into the first (index 1) of the 42 elements selected to form beam J.

Step 3: considering a set of beams (L−1, L, L+1), such that the beam L is offset from the center beam by an angular offset of minus P degrees. That is, beam L is offset from the beam which goes down the center of the water column by angle P in the opposite direction from beam J.

Step 4: for each beam in the set (L−1, L, L+1), checking the index (even or odd) of the element (1 through 120) whose output data is loaded into the first (index 1) of the 42 selected elements used to form that beam.

Step 5: if the index for beam J (output from step 2) is even, keep those beams in the set (L−1, L, L+1) whose index (step 4) was odd and discard the remaining beams. If the index for beam J (output from step 2) is odd, keep those beams in the set (L−1, L, L+1) whose index (step 4) is even and discard the remaining beams.

Step 6: of the beams in the set (L−1, L, L+1) which remain after step 5, keep the beam whose angular offset from the center beam is closest to the angle p. This beam is now designated beam I.

Figure 2:
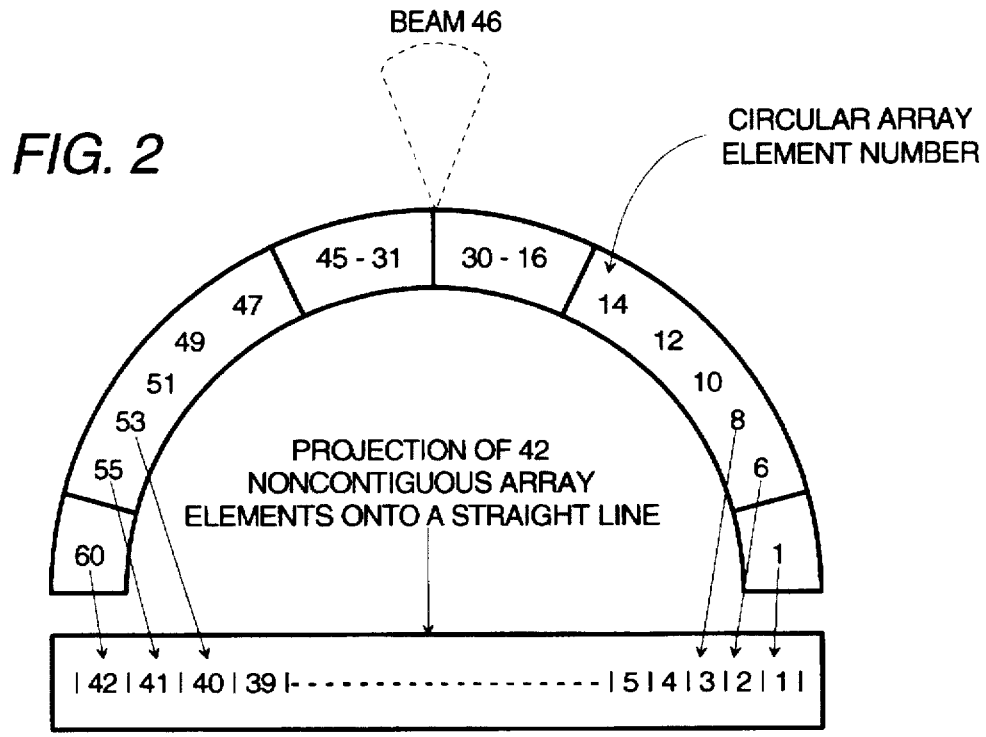
FIG. 2 is a projection of the 42 noncontiguous elements used to construct beam 46 for the prior art system.

The TVSS beamforming process 12 in FIG. 4 for beam J begins with the digitizing and storing transducer output block 18. For one preferred embodiment, all 120 transducer outputs each of which is 22000 points long are used. The 120 transducer elements are placed in a circular pattern (3 degrees apart) around a modified 21 inch torpedo housing. The 120 omni-directional transducer element array was designed to operate at 68 kHz with a 12.5 kHz bandwidth. The digitizing electronics and the storage media used during sea tests permitted the archiving of 22000 range cells for each transducer element at each ping, to be read into a computer and processed at some later time. The stored value for a range cell represents the average acoustic energy in the beam pattern for that particular element found at some range over an incremental radial interval of 0.03 meters. For example, the $10000^{th}$ value in signal (beam) 46 in FIG. 2 represents the average acoustic energy seen by element 46, over an incremental interval of 0.03 meters, at a range of 300 meters (10000*.03). A typical test run may have 800 to 900 pings worth of transducer data. The 120 transducer outputs are filtered at 22 to reduce or preferably to eliminate high frequency noise. The filtered outputs are used to generate the analytic signal at 26 for each of the 120 outputs. The Hilbert Transform portion of the analytic signal for each of the 120 stored transducer signals is generated using FFTs on the entire 22000 point array.

Figure 3:
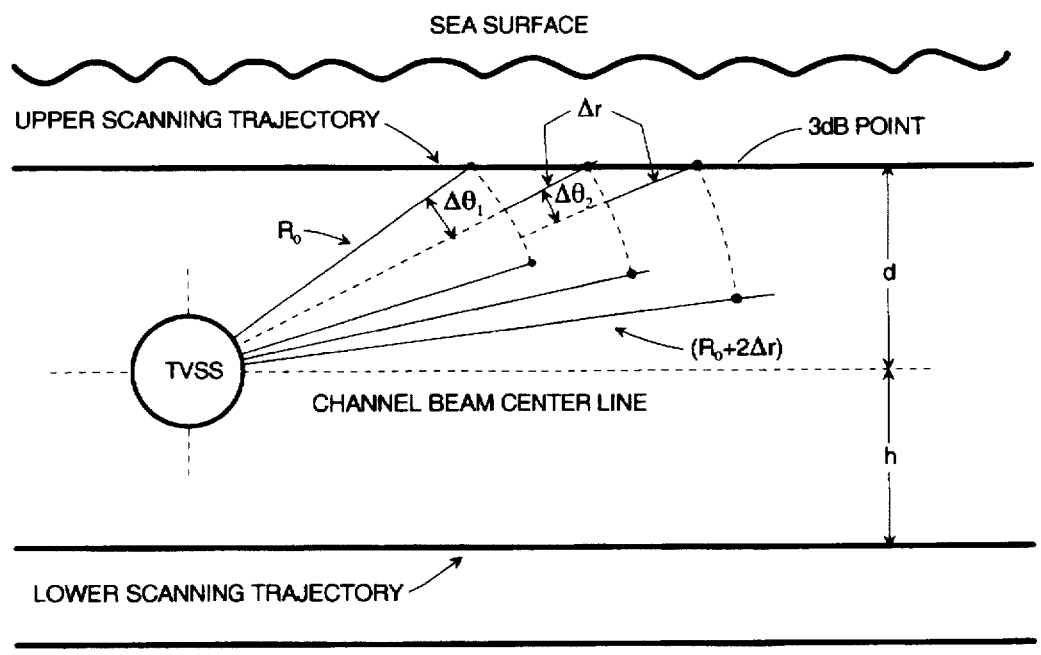
FIG. 3 is a heuristic depiction of the composite scanning beam concept.

At the input to block 30, select elements to form beam J, we have 120 analytic signals (each 22000 points long). Of those 120 signals, only 42 will be used to form a beam. For example, FIG. 3 shows the 42 elements used to form beam 46 for the case of no vehicle motion. The purpose of block 30 is to select for each range cell m, the proper 42 analytic signals which will be used to construct beam J.

The 42 stored signals in block 30 are fed one range cell at a time to block 31, multiplication, where they are multiplied by the 42 focusing coefficients. The focusing coefficients can change for each range cell in this invention. The focusing coefficients impart a phase shift (delay) to each of the signals.

The 42 signals out of block 31 are summed to form one signal. This signal is still analytic in nature. The summing process averages out noise.

The envelope detector 70 takes the absolute value of the analytic signal and gives a real number output for that particular range cell. This output is considered the beamformed output of the transducer array for beam J at the given range cell.

Figure 6:
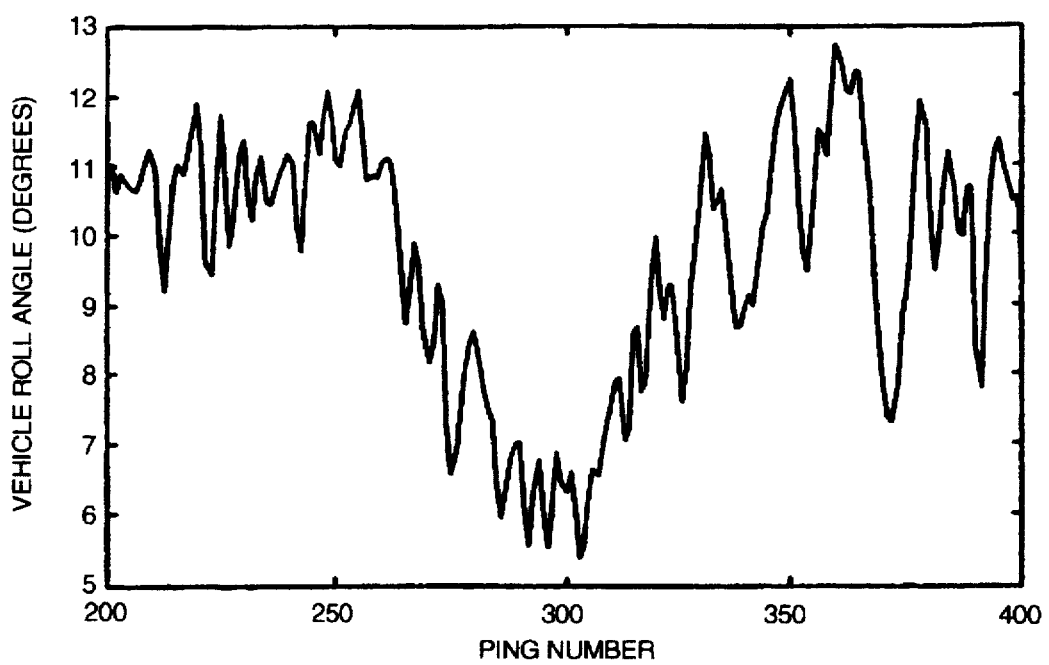
FIG. 6 is a plot of the TVSS tow vehicle roll angle versus ping number for a sea trial run.

During the collection of the 120 transducer element signals, vehicle roll angle information is also collected and stored. For each ping, 22000 values of vehicle roll angle are obtained by a vehicle motion sensor and are stored, one for each range cell. See FIG. 6 for roll angle per ping number information. The stored digitized TVSS vehicle roll angle data is retrieved at 34 and the angle ($\phi_R$) data is used at 38 to calculate for range cell m, the number of elements to shift, $S_m$, when forming a beam. The roll angle ($\phi_R$) data is also used at 42 to calculate the roll correction angle $\Delta\phi_R$.

During the collection of the 120 transducer element signals, sonar depth and height are also collected and stored. For each ping, one value of the sonar depth and sonar height is recorded. The sonar depth and height are considered to remain constant between pings. The stored and digitized TVSS depth and height data is retrieved at 46 and used with the selected scan trajectory to calculate $R_o$, at 50 and the scanning update angle $\Delta\theta_n$, for beam J. Prior to the range cell corresponding to $R_o$, the scanning update angle $\Delta\theta_n$, also designated as the range or trajectory steering angle is zero. The roll correction angle $\Delta\theta_n$, also designated as the roll steering angle, and the scanning update angle $\Delta\theta_n$, for beam J are summed at 54. The sum $\Delta\theta_n$ and $\Delta\theta_R$ represents the angle, for range cell m, that beam J must be steered to correct for vehicle roll and to scan beam J along the pre-selected scanning trajectory.

The (x, y) coordinate pairs for the location of the TVSS transducer elements used to form beam J are retrieved at 58 and used with the summed roll correction angle $\Delta\theta_R$ and the scanning update angle $\Delta\theta_n$ from 54 to generate at 62 a new set of (x, y) pairs for the coordinate system rotated by $\Delta\theta_R+\Delta\theta_n$.

The 42 (x, y) coordinate pairs retrieved at 58 for the rotated coordinate system at 62 are used to generate a set of focusing coefficients at 66 so as to focus and steer beam J by $\Delta\theta_n$ plus $\Delta\theta_R$. The focusing coefficients are multiplied at 31 with the 42 selected elements to form beam J and those products are summed at 32 to provide the signal for beam J for which the envelope is detected at 70.

The beamforming process for beam I at 14 is identical to that for beam J at 12. The envelope of beam I is detected at 74 and the envelope for beam J detected at 70 become the stored localized output values centered around range cell m for beam J and I at 78. The localized output values centered around range cell m for beams J and I at 78 are used to compute localized correlation coefficients between beams J and I for each range cell at 80.

The detected envelopes for beam I at 74 and beam J at 70 are also used to compute the average of beam I and J for range cell m at 82. This computed average from 82 and the localized correlation coefficient computed at 80 are multiplied together at 86 for each range cell to produce the composite beam output for range cell m.

The methodology of the present invention may be itemized in a series of twenty-one steps as follows:

Step 1: digitizing and storing signals for all transducer elements for all range cells for a given ping;

Step 2: filtering stored digitized data for all transducer elements for all range cells for a given ping, so as to reduce noise;

Step 3: generating an analytic signal for the output of all transducer elements for all range cells;

Step 4: obtaining and storing vehicle motion data to obtain vehicle roll angle for all range cells;

Step 5: obtaining and storing sonar depth and height data taken at start of ping;

Step 6: using vehicle roll angle from step 4, calculate the number of elements to shift, $S_m$, the shift index for a range cell m, so as to minimize the roll correction angle at said range cell m;

Step 7: using the roll angle from step 4, calculate the roll correction angle at range cell m;

Step 8: using the shift index, $S_m$, from step 6, and the beam number J (I), select the transducer elements from the output of step 3 which will be used to form a beam J (I) at range cell m;

Step 9: using the sonar depth and height from step 5, calculate a range at which scanning starts, and calculate a scanning update angle at range cell m for beam J (I);

Step 10: summing the roll correction angle from step 7 to the scanning update angle from step 9;

Step 11: retrieving, for beam J, the (x, y) coordinates of the transducer elements as referenced from the center of the transducer array;

Step 12: generating, for beam J, a new set of (x, y) coordinates of the transducer elements for the coordinate system used in step 11 rotated by the output of step 10;

Step 13: generating for beam J, a set of focusing coefficients using the output from step 12;

Step 14: multiplying the focusing coefficients obtained from step 13 by the output of the transducer elements selected in step 8, for each range cell m;

Step 15: summing the 42 transducer outputs from step 14, for each range cell m;

Step 16: envelope detecting the output from step 15, for each range cell m;

Step 17: repeating steps 6 through 16 for each range cell m in beam I; and

Step 18: storing localized output values, centered around range cell m for beam I and J;

Step 19: computing the localized correlation coefficient between beam I and beam J for each range cell m;

Step 20: computing the average intensity of beam I and beam J for each range cell m; and Step 21: multiplying the output of step 20 by the correlation coefficient computed in step 19 to obtain the composite beam output for each range cell m.

Figure 7:
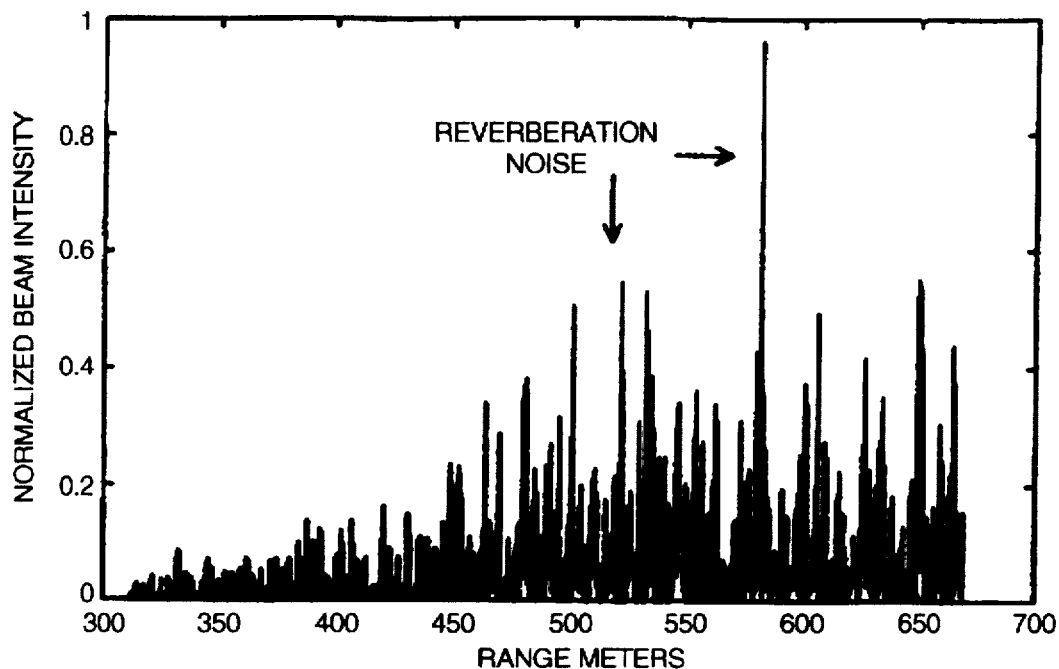
FIG. 7 is a plot of the normalized beam intensity versus range for beam 46 of the prior art system.
Figure 8:
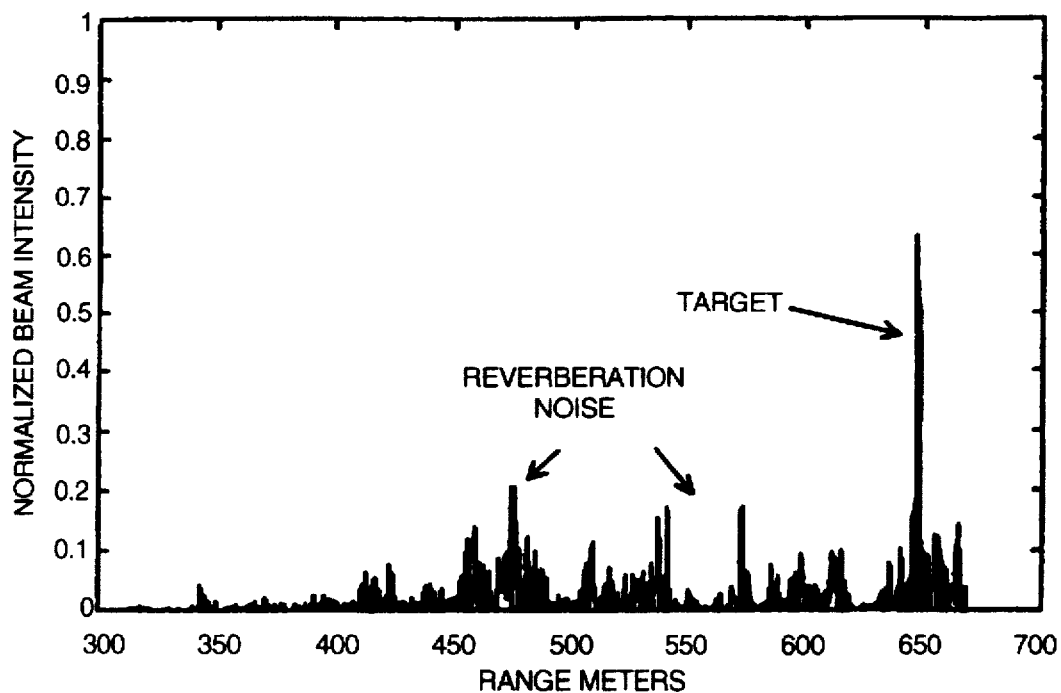
FIG. 8 is a plot of the normalized beam intensity for the composite beam, created in accordance with the proposed invention.

It should be understood that acceptable levels of detection may be obtained with fewer steps in the above process being executed. Thus, an 18 step process using steps 1 through 17 above and a step 18 comprising step 20 above and eliminating the original step 18, 19, and 21 may be used to compute the average intensity of beams I and J for each range cell m. This eliminates the need to store localized output values centered around range cell m for beam I and J. It also eliminates the necessity for computing a localized correlation coefficient between beams I and J for each range cell m, and it eliminates the step of multiplying the computed average intensity of beams I and J for each range cell m by the correlation coefficient computed in step 19 above to obtain the composite beam output for each range cell m. A significantly improved result is thus obtainable. Also, improved detection is possible even where beams I and J are not chosen to minimize the number of common elements between them. FIG. 7 depicts normalized beam intensity versus range with significant reverberation noise content prior to processing by the present invention. FIG. 8 is a plot of normalized beam intensity for the composite beam showing the significantly reduced reverberation noise.

Apparatus

Figure 9:
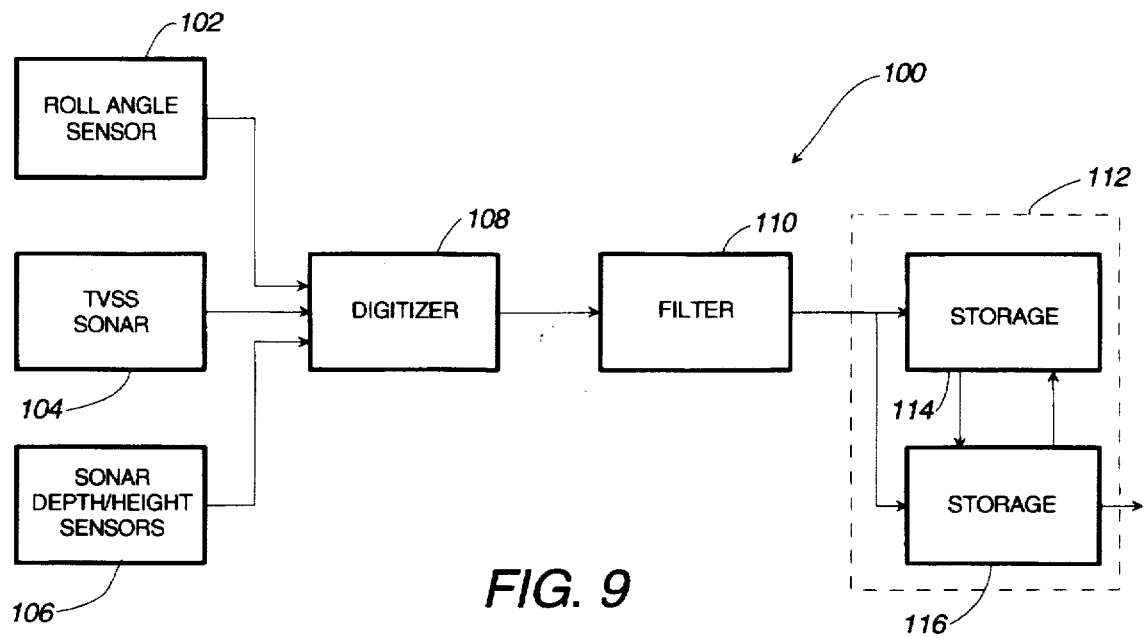
FIG. 9 is a block diagram of the apparatus of the present invention.
Figure 10:
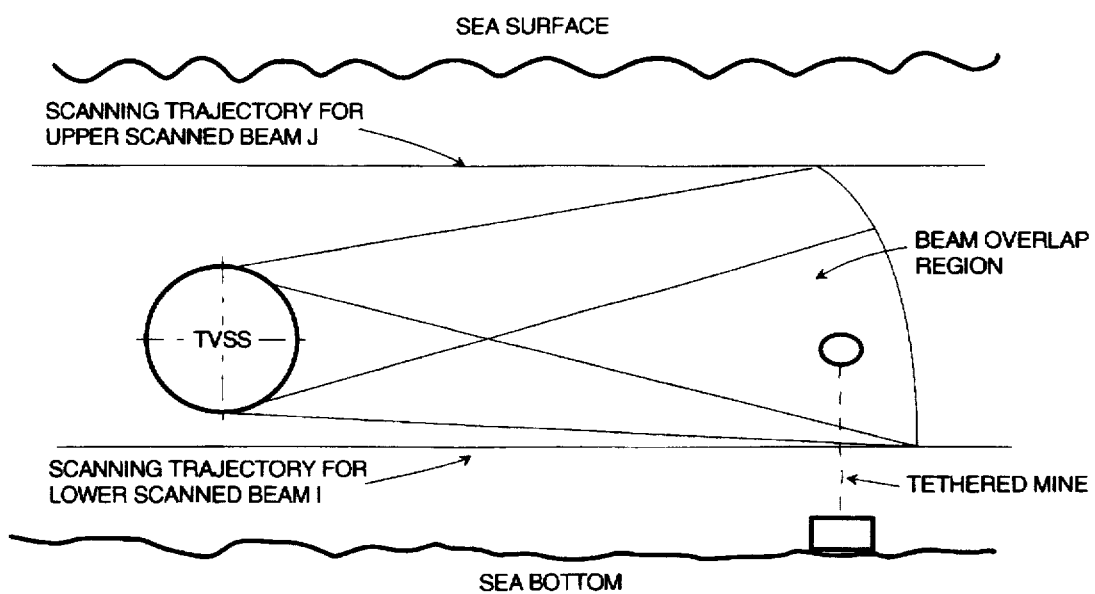
FIG. 10 is a heuristic depiction of the shallow water scanning concept.

The apparatus 100 of the present invention is depicted in FIG. 9. The FIG. 9 representation is one of a general embodiment which may be implemented in a number of different configurations of hardware and software. As shown in FIG. 9, the apparatus 100 is comprised of a means for collecting roll angle $\phi_R$ information for the TVSS array vehicle as it moves forward through the sea. The vehicle roll angle sensor 102, shown in the block diagram in FIG. 10, is used to obtain continuous vehicle roll angle information during the ping cycle. From the vehicle roll information, the roll correction angle $\Delta\phi_R$ that is necessary to keep the beams geometrically fixed in space is calculated at 38 for each range cell. By "decoupling" the elements (staves) from the beams, the steering angle to correct for roll is minimized and the elements used to create a given beam may change during the ping cycle. For example, assume no vehicle motion with an element spacing of 3 degrees, and that beam J is formed centered between elements K and K+1. If the vehicle has rolled $\phi_R$ degrees, then beam J is formed, (at that particular moment in time) using elements centered around M+$S_m$, and M+1+$S_m$ where s is the shift index defined by the integer portion of the quotient, $\phi_R/3$. The steering angle to correct for vehicle roll, $\Delta\phi_R$, is given by the minimum of remainder ($\phi_R/3$) or 3-rem ($\phi_R/3$), where the symbol rem stands for remainder after division. Hence, the steering angle to correct for roll in the invention never exceeds the element spacing in degrees divided by two. Because of the circular symmetry of the transducer element pattern, the same shift index and roll correction angle can be applied to all 180 beams formed to keep them stationary, that is, geometrically fixed in space.

Roll angle $\phi_R$ signals from 102, along with the TVSS sonar 104 signals, and the outputs of the sonar depth/height sensors 106 are digitized by the digitizer 108.

The TVSS sonar signal outputs of the digitizer 108 are filtered digitally by filter 110 to accomplish preliminary noise reduction. The output of filter 110 is introduced to the computer 112 either to storage 114 or directly to the processor 116. The filter 110 is shown external to computer 112, but as known by those skilled in the art, it may just as easily be included in the computer 112. Likewise known to those skilled in the art, a program routine for performing digital filtering may be part of the program stored in storage 114 for performing all of the processing discussed in the procedural description herein. The most important and critical of these to the invention are the means for calculating the necessary element shift index, $S_m$, to minimize beam steering, a means of calculating the necessary roll correction angle, $\Delta\phi_R$, to keep the beams geometrically fixed in space, a means of calculating an additional scanning update angle, $\Delta\theta_n$, to keep the 3 dB point of a scanned beam along a given trajectory, a means of computing a localized correlation coefficient between specially selected scanned beams, and a means for multiplying the localized correlation coefficient by the average intensity of the two scanned beams.

The invention also calls for taking data, defining depth and height of the sonar platform and calculating, for selected beams, an additional steering angle, $\Delta\theta_n$, which tracks the selected beams along predetermined paths, called scanning trajectories, which run parallel along the interfaces. FIG. 3 illustrates this beam scanning concept. The stabilized (geometrically fixed in space) beam points radially along a straight line path from the array until the upper 3 dB point of the beam contacts the predetermined scanning trajectory, at which time scanning is initiated. Scanning is initiated by steering the beam ($\Delta\theta_n$ radians) and allowing it to propagate a fixed distance ($\Delta r$) before steering it again. In this manner, the upper 3 dB point of the beam never penetrates beyond the scanning trajectory, and hence never contacts the surface. The location of the scanning trajectory is arbitrary. It is usually based on the roughness of the sea surface (sea state) and the accuracy of the vehicle motion measurement package.

The range, $R_o$, at which scanning is initiated for a given stabilized beam, assuming 180 beams with two degree beam spacing, is obtained from simple geometry:

$$R_0 = \frac{d}{\sin((2k+1)^\circ)} \quad (1)$$

where k is equal to the absolute value of the scanning beam number minus the beam number of the beam that is centered along the water column (46 for the port side channel beam, and 136 for starboard side channel beam), and d is the vertical distance between the center line of the stabilized channel beam and the scanning trajectory, as illustrated in FIG. 3. For example, if beam 41 were to be scanned, then k would equal 5 (absolute value of 41 minus 46).

The updating angle for the scanning beam, $\Delta\theta_n$, is not fixed but is a function of the range at which scanning starts, $R_o$, the sonar depth, d, below the upper scanning trajectory, and the height, h, above the lower scanning trajectory, the fixed distance between updates, $\Delta r$, and the updating index n. The scanning update angle in radians for a beam scanned along the upper scanning trajectory is calculated as $$\Delta\theta_{n+1} = \sin^{-1}\left(\frac{d}{R_n}\right) - \sin^{-1}\left(\frac{d}{R_n + \Delta r}\right) \quad n=0,1,2,\ldots \quad (2)$$

where $R_n=R_{n-1}+\Delta r$ (for n greater than zero) with $\Delta r$ defined as a small fixed length (minimum of one range cell) over which the scanning steering angle, $\Delta\theta_n$, remains unchanged; d is as previously defined in equation (1). FIG. 3 heuristically shows two update cycles for a scanned beam. A similar analysis may be applied to beams scanned along the lower scanning trajectory. Once the steering angle for the scanned beam has been calculated, it is added to the roll correction angle and a new set of complex focusing coefficients for that beam are generated, as shown in FIG. 4.

The third and fourth objects of the invention call for the creation of a composite beam, where the reverberation noise has been minimized by a judicious choice of beam numbers and scanning trajectories. The composite beam is created by first averaging the intensity of two scanned beams. Further reduction in the reverberation noise is obtained by multiplying the composite beam by a range dependent correlation coefficient computed over a localized moving window between the two scanned beams. This procedure reinforces the correlated portions in the scanned beams (targets) while decreasing those portions which are uncorrelated (noise). To enhance the reduction of the system noise, the two scanned beams are created from the maximum number of noncommon elements within a given angular beam separation.

FIG. 10 heuristically illustrates the scan averaging concept at the beam level. The target is common to both scanned beams. In one set of beam elements, the noise is strongly influenced by surface reverberation and in the other set of beam elements, the noise is strongly influenced by bottom reverberation. The surface sea-state and bottom type, depth and range, determine the degree to which the surface and bottom reverberation are uncorrelated. In addition, since the thermal noise associated with the individual receiving system of each element is assumed uncorrelated between the elements, minimizing the number of common elements in the scanned beams further improves the signal to noise ratio. Although the lower beam is looking in the same general direction as the upper scanned beam; the two beams are constructed from a minimum of common elements by exploiting the fact that noncontiguous elements are used to create each 2 degree beam. For example, the number of common elements in the beam pair 40 and 52 is 32 whereas the number of common elements for the beam pair 41 and 52 is only 29. Therefore, the composite beam formed by 41 and 52 has less system noise than does the composite beam formed by 40 and 52, even though the angular separation between beam 40 and 52 is greater.

These and other features and advantages of the present invention will become apparent to those skilled in the art upon a reading of the following detailed description when taken in conjunction with the drawings wherein there is shown and described an illustrative embodiment of the invention.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. The process of forming a composite beam from a toroidal volume search sonar to detect objects in shallow water from the return signals for each ping received by circular transducer array elements for all range cells for a given ping, comprising the steps of:

Step 1: digitizing and storing signals for all transducer elements for all range cells for a given ping;

Step 2: filtering stored digitized data for all transducer elements for all range cells for a given ping, so as to reduce noise;

Step 3: generating an analytic signal from said filtered and digitized data for the output of all transducer elements for all range cells;

Step 4: obtaining and storing vehicle motion data and obtaining vehicle roll angle for all range cells therefrom;

Step 5: obtaining and storing sonar depth and height data taken at start of ping;

Step 6: using vehicle roll angle from step 4, calculating the number of elements to shift, $S_m$, the shift index for a range cell m so as to minimize the roll correction angle at said range cell m;

Step 7: using the roll angle from step 4, calculating the roll correction angle at range cell m;

Step 8: using the shift index, $S_m$, from step 6, and the beam number J (I), selecting the transducer elements from the output of step 3 which will be used to form a beam J (I) at range cell m;

Step 9: using the sonar depth and height from step 5, calculating a range at which scanning starts, and calculating a scanning update angle at range cell m for beam J (I);

Step 10: summing the roll correction angle from step 7 to the scanning update angle from step 9;

Step 11: retrieving, for beam J the (x, y) coordinates of the transducer elements as referenced from the center of the transducer array;

Step 12: generating, for beam J, a new set of (x, y) coordinates of the transducer elements for the coordinate system used in step 11 rotated by the output of step 10;

Step 13: generating for beam J, a set of focusing coefficients using the output from step 12;

Step 14: multiplying the focusing coefficients obtained from step 13 by the output of the transducer elements selected in step 8, for each range cell m;

Step 15: summing the 42 transducer outputs from step 14, for each range cell m;

Step 16: envelope detecting the output from step 15, for each range cell m; and

Step 17: repeating steps 6 through 16 for each range cell m in beam I; and

Step 18: computing the average intensity of beam I and beam J for each range cell m.

2. The process of claim 1 further comprising the step of storing localized output values centered around range cell m for beams I and J, prior to computing the average intensity of beams I and J for each range cell m.

3. The process of claim 2 further comprising the step of computing a localized correlation coefficient between beam I and beam J for each range cell m.

4. The process of claim 3 further comprising the step of multiplying the computed averages of beams I and J for each range cell by the localized correlation coefficient between beams I and J for each range cell to produce a composite beam output.

5. The process of claim 4 further comprising the step of progressively incrementing the beam in range along a scanning trajectory in parallel with the sea surface a distance d from the channel beam centerline and in parallel with the sea bottom a distance h from the channel beam centerline.

6. An apparatus for beamforming for a toroidal volume search sonar for detection of objects in shallow water over a finite range between levels where reverberation occurs near the water surface to levels where reverberation occurs near the bottom, comprising:

means for selecting sonar beams for forming;

means for preventing a sonar beam from contacting the water surface and the water bottom over a finite range; and means for forming from two beams, a composite beam partially canceling out said surface and bottom-caused reverberation.

7. The apparatus of claim 6 wherein the means for preventing a sonar beam from contacting the water surface and the water bottom, comprises:

means for producing vehicle motion data;

means for selecting a beam;

means for using said vehicle motion data to stabilize said selected beam so as to compensate for array vehicle roll;

means for selecting scanning trajectories running parallel to said sea surface and sea bottom; and means for calculating for said selected beam, using sonar platform depth and height data, a steering angle for steering said beam along said trajectories.

8. The apparatus of claim 6 further comprising:

means for pointing selecting stabilized beams along said trajectories near the surface and the bottom; and means for initializing scanning.

9. The apparatus of claim 8 wherein the range $R_o$ at which scanning is initiated for a given stabilized beam for a two degree beam spacing is $$R_0 = \frac{d}{\sin((2k+1)^o)}$$

where k equals the absolute value of the scanning beam number minus the beam number of the beam that is centered along the water column and d is the vertical distance between the centerline of the stabilized channel beam and the scanning trajectory.

10. The apparatus of claim 9 wherein the updating angle for the scanning beam, $\Delta\theta_n$, is a function of the range at which scanning starts, $R_o$, sonar depth d, below the upper scanning trajectory and sonar height h, above the lower scanning trajectory, the fixed distance $\Delta r$ between updates and the updating index n.

11. The apparatus of claim 10 wherein the scanning update angle in radians for a beam scanned along the upper scanning trajectory is defined by $$\Delta\theta_{n+1} = \sin^{-1}\left(\frac{d}{R_n}\right) - \sin^{-1}\left(\frac{d}{R_n + \Delta r}\right) n = 0, 1, 2, \ldots$$

where $R_n = R_{n-1} + \Delta r$ for n greater than zero, with $\Delta r$ defined as a small fixed length of a minimum of one range cell over which the scanning steering angle, $\Delta\theta_n$, remains unchanged, and where $R_o$ is obtained from $$R_0 = \frac{d}{\sin((2k+1)^o)},$$

where k equals the absolute value of the scanning beam number, minus the beam number that is centered along the water column and where d is the vertical distance between the centerline of the stabilized channel beam and the scanning trajectory.

12. The apparatus of claim 6 where said means for forming a composite beam comprises:

means for selecting and processing two beams, one containing a target and dominated by surface reverberation and the other containing said target and dominated by bottom reverberation; and means for performing a correlation and averaging process on said two beams to reduce reverberation level in said combined beam.

13. The apparatus of claim 12 wherein said beams are selected such that the number of common elements associated with said two beams to be correlated and averaged is a minimum with in a given angular separation between said beams.

14. An apparatus for beamforming a toroidal volume search sonar (TVSS) signal to improve long range, shallow water detection capability, comprising:

means for obtaining and using vehicle motion data to fix the TVSS beams geometrically in space to prevent one or more of such beams from contacting, prior to a prespecified range, the sea surface or sea bottom interfaces;

means for pointing selected stabilized beams along scan trajectories near said interfaces so as to reduce reverberation entering said beams from said interfaces; and means for correlating and averaging two scanned beams one containing the target dominated by bottom reverberation and one containing the target dominated by surface reverberation, to create a composite beam having a reduced reverberation level.

15. The apparatus of claim 14 wherein the number of common elements associated with the two beams to be correlated and averaged is a minimum within a given angular separation between the beams so as to further reduce the reverberation within the composite beam.

16. An apparatus for beamforming for a toroidal volume search sonar for detection of objects in shallow water over a finite range between surface and bottom interfaces where reverberation occurs, comprising:

means for digitizing and storing TVSS sonar transducer signals;

means for retrieving said stored digitized transducer signals;

means for filtering said digitized data for noise reduction;

means for generating an analytic signal for all transducer elements;

means for obtaining and storing vehicle motion data;

means for retrieving stored vehicle motion data and obtaining vehicle roll angle for all range cells;

means for obtaining and storing sonar start of ping depth and height data;

means for retrieving stored sonar start of ping depth and height data;

means for calculating the shift index for each range cell from said roll angle data and decoupling the sonar array elements from the beams to minimize beam steering and permit change of elements used to create a given beam during a ping cycle;

means for calculating roll correction angle $\Delta\theta_R$ for a steering angle to correct for vehicle roll, at each range cell from said vehicle roll angle data for each range cell;

means for selecting the transducer elements to form each of two beams at each range cell;

means for calculating the range at which scanning starts and calculating the scanning update angle at each range cell for each of said beams;

means for summing the roll correction angle to the scanning update angle for each of said beams;

means for retrieving coordinates of transducer elements referenced from the center of the transducer array;

means for generating coordinates for rotated coordinate system;

means for generating a set of focusing coefficients for each of said beams;

means for multiplying focusing coefficients by outputs of selected transducer elements for each of said beams;

means for summing the product of transducer element outputs and focusing coefficients for each range cell for each of said beams;

means for detecting the envelope of the summed products comprising the localized output values for each range cell for each of said beams;

means for storing said localized output values centered around each range cell for each of said beams;

means for computing a localized correlation coefficient between each of said beams for each range cell;

means for computing the average intensity of said beams for each said range cell; and means for multiplying said localized correlation coefficient for said beams by the average intensity of said beams to produce a composite beam output for each said range cell.

17. The apparatus of claim 16 wherein the steering angle to correct for vehicle roll does not exceed the spacing of array elements in degrees divided by two.

18. The apparatus of claim 16 wherein the steering angle to correct for vehicle roll, $\Delta\phi_R$ is given by the minimum of remainder ($\phi_R/n$) or n-rem ($\phi_n/n$) where rem is the remainder after division, and n is the array element spacing in degrees.

* * * * *